Sept. 4, 1934.  H. H. GARNER  1,972,398
AIR CLEANER HAVING INTERNAL AXIAL INLET
Filed July 3, 1929
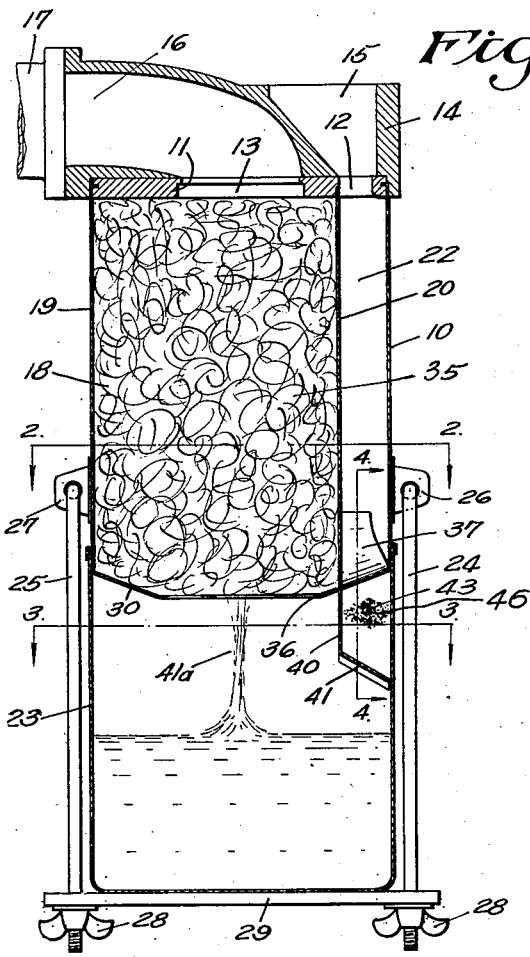
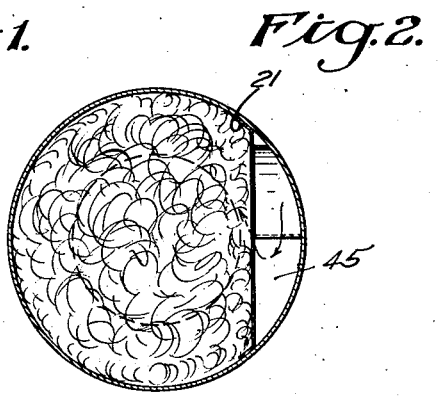
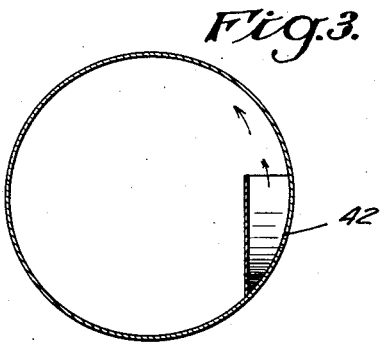
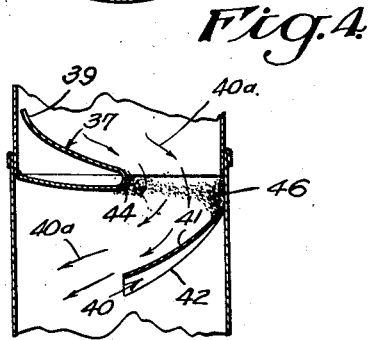
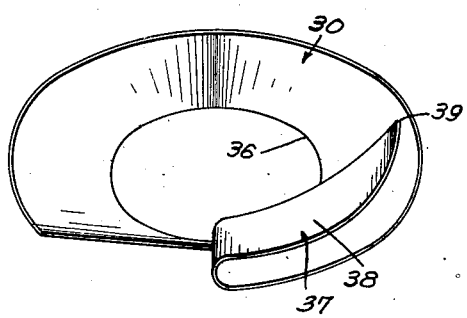
INVENTOR:
Herman H. Garner,
By Ford W Davis
ATTORNEY.

Patented Sept. 4, 1934

1,972,398

UNITED STATES PATENT OFFICE 1,972,398

AIR CLEANER HAVING INTERNAL AXIAL INLET

Herman H. Garner, Claremont, Calif., assignor to Vortox Manufacturing Company, Claremont, Calif., a corporation of California Application July 3, 1929, Serial No. 375,758

8 Claims. (Cl. 183—9)

My invention relates to improvements in air cleaners such as are used for removing dust particles from the air supply to internal combustion engines.

My invention is particularly applicable to tractors or to automobiles which operate under extremely dusty conditions.

My invention is designed to remove most of the dust from the air before it reaches the filter, thus preventing the interstices of the filter from becoming rapidly clogged with dust and permitting continuous efficient operation of the engine for a reasonable length of time without the necessity of cleaning the filter.

In my invention a greater part of the dust is removed from the air before it reaches the filter by utilizing the difference in the specific gravities of the dust and air as hereinafter described. Heretofore it has not been found possible to remove all of the dust from the air by this means.

An object of my invention is to provide means for removing dust from the air which shall be thorough and wherein the air will travel in a tangential or cyclonic path through the interior of the cleaner, whereby a more efficient separation of the foreign particles from the air is accomplished.

Another object of my invention is to provide an air cleaner of the character described which is made of cylindrical shape and in which the air entering the filter is given a cyclonic motion for the purpose of throwing the dust particles to the outside of the filter, the material of which the filter is composed being so disposed as to cooperate with said cyclonic motion to effect a very perfect separation of dust particles with a minimum obstruction of the air to the intake of the engine to which it is applied.

A further object of my invention is to provide an air cleaner with baffle means for causing the separation of foreign particles from the air previous to the introduction of the air to the filter proper, and wherein the air is introduced and evacuated from one end of the air cleaner.

Another object of my invention is to provide an air cleaner having an internal axial inlet, at the end of which is centrifugating means.

A still further object of my invention is to provide an air cleaner with means for exposing the deposit of dust after it has adhered to a portion of the liquid-holding can.

Referring to the drawing, which is for illustrative purposes only,

Fig. 1 is a vertical section of an air cleaner embodying my invention.

Fig. 2 is a horizontal section on the line 2—2 of Fig. 1.

Fig. 3 is a horizontal section on the line 3—3 of Fig. 1.

Fig. 4 is a section on the line 4—4 of Fig. 1, and illustrates the construction and arrangement of the air inlet column and air baffles.

Fig. 5 is a perspective view of the annular frusto-conical baffle plate.

In the embodiment of my invention illustrated in the drawing, 10 is a cylindrical casing which is provided with a top plate 11. The top plate 11 is formed adjacent one end with an opening 12 and a relatively larger centrally disposed opening 13. Secured in any appropriate manner to the top plate 11 is a top casting 14 formed with an air inlet passage 15 leading from the atmosphere and which communicates with the opening 12 of the plate 11, and a lateral air outlet passage 16 is likewise provided in the casting 14 which communicates with the opening 13. A pipe 17 connects with the intake of a carburetor of the engine, not illustrated, and is adapted to fit within the outer end of the lateral air outlet passage 16 of said top casting 14.

Inside the casing 10 is a segmental receptacle 18 formed by a portion of a wall 19 of the casing and a flat plate 20. This plate 20 has its edge portions 21 attached to the wall 19 while its top edge fits into a groove in the plate 11 and provides an axially directed passage or column 22 between the receptacle 18 and the wall 19 at one side of the casing, said column 22 communicating with the air inlet openings 12 and 15 of the top plate 11 and casting 14. Secured to the lower end of the casing 10 is a receptacle or cup 23. Rods 24 and 25 have their upper ends pivotally mounted in lugs 26 and 27 on opposite sides of the lower end of the casing 10 and carry wing nuts 28 which, when adjusted, are adapted to engage against the lower surface of a base plate 29 for detachably supporting the receptacle upon the casing 10. The receptacle 23 need not make an absolutely air-tight joint with the casing 10.

As heretofore stated, the passage 22 is formed by a portion of the cylindrical wall 19 of the casing and said flat plate 20. Secured in any appropriate manner in the lower open end of the casing 10 is an annular frusto-conical plate 30 clearly illustrated in Figs. 1 and 5.

A body of matted wire material 35 is packed into the receptacle space 18.

The baffle plate 30 is preferably stamped from sheet metal and has a relatively large central opening 36 formed therein. The baffle plate 30 is slit transversely and the metal of one of the ends thus formed is bent rearwardly over a part of the plate body to form a baffle 37, the major portion of which is curved downward at 38 and then upward at 39. The baffle 37, when the plate 30 is in position as indicated in Figs. 1 and 4, extends upward into the lower part of the axial passage or column 22.

Connected to the lower end of the flat plate 20 and forming a continuation thereof, is a plate 40, the lower end of which is bent outward and downward to form the angularly disposed baffle 41. The outer edge of the baffle 41 is curved at 42 to correspond to the curvature of the wall of the casing. The plate 40 when connected to the partition plate 20 forms an area 43 between itself and the wall 19 of the casing which may be defined as a continuation of the axially directed passage or column 22. The baffle 41 projects diagonally downward across the lower column area 43 and terminates just beyond the point 44 at which the split portion of the frusto-conical plate 30 is bent to form the baffle 37. Resultant of the placement of the baffles 37 and 41 a relatively restricted passage 45 is formed between the lower end of the column 22 and the lower column area 43.

As illustrated in Fig. 4, the air entering the column 22 impinges against the baffle 37 and is centrifugated through the passage 45 at a high speed and impinges against the inclined surface of the baffle 41, which latter is disposed in the direction opposite to that of baffle 37.

A cyclonic action is caused by the direction of travel of the air as it enters the chamber as illustrated in Fig. 4, and a more efficient separation of the foreign particles from the air is accomplished. As a result of this construction a ring of relatively wet dust 46 is formed on the inner surface of the receptacle 23 within the area 43, as illustrated in Fig. 4, where it is exposed to view when the receptacle or cup is removed for refilling or for cleaning.

The method of operation of the invention is as follows:

Before starting the engine, oil is placed in the receptacle 23. When the engine is started, it creates a vacuum in the upper part of the casing, this vacuum drawing air through the inlet openings 15 and 12 and through the column 22. The incoming air at atmospheric pressure carrying dust particles is caused by its direction of travel through the column 22 to first engage the baffle 37 and then the baffle 41, causing the air to travel in a tangential or cyclonic path through the lower part of the cleaner as indicated by arrows 40a, thus forming a vortex 41a. Due to the centrifugal action of the air, the dust particles are thrown violently outward against the wet walls of the receptacle upon which it adheres. The suction of the engine pulls clean air from the center of the vortex 41a upward through the central opening 36 of the plate 30. The air is then sucked by the engine suction through the filter material 35 and through the lateral opening 16 and the pipe 17 into the intake of the carburetor.

By the novel arrangement of the baffles 37 and 41 described, I am able to so construct my device that a portion of the oil is also sucked upward through the conical plate opening 36 into the matted mass of filter material 35. This upward movement of the oil is due to the vortex 41a, the pressure in the center of the vortex being considerably lower than at the edges.

The filter material is preferably composed of lengths of spring wire kinked and matted together in the upper casing section. This oil caught in the filter material may run through the opening 36 and back into the receptacle 23, carrying dirt from the filter material with it. This dirt settles in the receptacle, forming a sediment which can be readily removed by detaching the lower section from the casing proper.

In practice the oil is utilized as a washing agent for the filter material, this washing taking place whenever the engine is run.

I claim as my invention:

1. An air filter comprising: a casing having an axially directed internal air inlet; a mass of filter material arranged in said casing; a receptacle connected to said casing adapted to contain a liquid; a frusto-conical plate disposed between said filter material and receptacle, said conical plate having a portion slit and bent over to provide the lower end of said internal air inlet with an upwardly curved wall; and a plate connected to said casing below said air inlet, said plate being formed with a downwardly curved wall, and said walls forming baffle means for directing air through said inlet in a tangential direction to produce a cyclonic agitation of the air in said casing.

2. An air filter comprising: a casing; a closure for said casing having air inlet and outlet passages; a receptacle connected to said casing, said casing having a partition forming a filter material chamber and an axially directed air inlet column at one side of said chamber, said air column communicating with said receptacle, and said chamber communicating with said outlet passage; a frusto-conical plate disposed between said chamber and said receptacle, said frusto-conical plate being split and having a part bent upward to form a baffle extending into said air column and adapted to direct the incoming air to one side of said column; and a plate connected to said casing below said air column and having a baffle adapted to direct air in the opposite direction from which it is directed by the first-mentioned baffle, so that the air will travel in a tangential or cyclonic path in the interior of said casing.

3. An air filter comprising: a casing having a chamber adapted to receive a filter material; a wall extending through said casing and forming an axially directed air column at one side of said chamber; a receptacle connected to said casing adapted to receive a liquid therein; a plate separating said filter chamber from said receptacle, said plate having a portion split and bent over to form a baffle extending upwardly into said air column; and a plate connected to the lower part of said casing and extending into said receptacle, said plate having a downwardly bent baffle disposed in the opposite direction from that of said first-mentioned baffle, and said baffles adapted to direct the incoming air in a cyclonic path in the interior of said casing.

4. An air filter comprising: a casing adapted to contain a filter material; a receptacle connected to said casing adapted to contain a body of liquid; a closure for one end of said casing, said closure having an air inlet passage communicating with said receptacle and an air outlet passage communicating with an engine manifold; a frusto-conical plate interposed between said casing and receptacle, said frusto-conical plate supporting said filter material in said casing and being formed with an upwardly directed baffle; and a plate connected to said casing adjacent said frusto-conical plate and being formed with a downwardly disposed baffle, and said baffles adapted for producing a cyclonic agitation of the air admitted through said air inlet passage for separating foreign particles from the air to be introduced into said filter and through said outlet passage.

5. An air filter comprising: a casing adapted to contain a filter material; a closure for the top of said casing; a receptacle connected to the opposite end of said casing, said casing having an air column formed therein, said closure having an air inlet opening communicating with said casing column and an outlet opening communicating at one end with said filter material; a frusto-conical plate disposed between said casing and receptacle, said frusto-conical plate being formed with an upwardly directed baffle extending within said air column; and a plate connected to said casing below said column and being formed with a baffle extending in a direction opposite to that of the first-mentioned baffle, said baffles adapted for producing a cyclonic agitation of air in said receptacle for separating foreign particles from the air prior to the introduction of said air into said filter material.

6. An air filter comprising: a substantially cylindrical casing having upper and lower sections detachably connected together; a closure for said upper casing section; a filter material arranged in said upper section; a body of liquid disposed in said lower section, said closure formed with air inlet and outlet passages, said casing providing an air column connecting the air inlet passage with said lower section; a frusto-conical plate disposed between said sections and having an opening establishing communication therebetween; an upwardly directed baffle formed on said frusto-conical plate; a plate connected to said casing below said air column; a downwardly directed baffle on said last-mentioned plate, and said baffles adapted to produce a cyclonic agitation of air introduced through said column into said lower section for pre-separating foreign particles from the air introduced into said filtering material.

7. An air filter comprising: a substantially cylindrical casing having upper and lower sections detachably connected together; a closure for said upper section having air inlet and outlet passages; a plate connected to said upper section and forming a chamber and an axially directed air inlet column therein, said chamber adapted to receive a filter material, said lower section adapted to contain a fluid; a frusto-conical plate separating said casing sections, said plate being split to form an upwardly curved baffle adapted to extend within said axial air inlet column for directing the incoming air to one side thereof; and a plate connected to said casing and extending within said lower casing section, said last-mentioned plate being formed with a downwardly curved baffle adapted to direct the air in the opposite direction from which it is directed by the first-mentioned baffle so that the air will travel in a cyclonic path in the interior of said casing.

8. An air filter comprising: a casing adapted to receive a body of filter material; a receptacle enclosing the lower end of said casing and adapted to contain a liquid; a wall cooperating with said casing in defining an axially directed air inlet at the side of said casing; a wall defining a central axially directed air outlet; and air-centrifugating means disposed at the end of said air inlet.

HERMAN H. GARNER.